United States Patent [19]

Tate, Jr.

[11] 3,904,280

[45] Sept. 9, 1975

[54] METHOD AND APPARATUS FOR DETERMINING THE DISTANCE BETWEEN THE SURFACE OF AN EYE AND A REFERENCE POINT

[75] Inventor: George W. Tate, Jr., Dallas, Tex.

[73] Assignees: Giles C. Clegg, Jr.; John R. Lynn, both of Dallas, Tex. ; part interest to each

[22] Filed: Dec. 28, 1973

[21] Appl. No.: 429,020

[52] U.S. Cl. .............. 351/1; 351/38; 356/1; 356/17
[51] Int. Cl.² .................. A61B 3/10; G01C 3/00
[58] Field of Search ............. 356/1, 12, 17; 351/38, 351/1

[56] References Cited
UNITED STATES PATENTS

| | | | |
|---|---|---|---|
| 1,651,661 | 12/1927 | Armbruster | 351/38 |
| 2,081,969 | 6/1937 | Allen et al. | 351/38 X |
| 3,002,093 | 9/1961 | Kis et al. | 356/17 X |
| 3,187,185 | 6/1965 | Milnes | 356/1 X |
| 3,408,137 | 10/1968 | Reiner | 351/28 |
| 3,610,128 | 10/1971 | Bellows | 356/12 X |
| 3,622,242 | 11/1971 | Land et al. | 356/12 |
| 3,807,858 | 4/1974 | Finch | 356/1 |
| 3,817,631 | 6/1974 | Kawahara | 356/1 |

Primary Examiner—Paul A. Sacher
Attorney, Agent, or Firm—Giles C. Clegg, Jr.

[57] ABSTRACT

The distance between the cornea of a human eye and some reference point is determined by projecting, from locations on either side of the reference point, a pair of light images toward the eye so that the pathways traversed by the projected light images intersect at some predetermined distance from the reference point. The desired distance between the eye and the reference point is determined when the person is positioned so that the projected images are superimposed on the cornea of the person's eye. In accordance with one embodiment of the invention, when the desired distance is determined, moveable headrest apparatus which is in contact with the person's forehead is locked in place to assist in preventing further movement of the person's head.

12 Claims, 10 Drawing Figures

METHOD AND APPARATUS FOR DETERMINING THE DISTANCE BETWEEN THE SURFACE OF AN EYE AND A REFERENCE POINT

BACKGROUND OF THE INVENTION

This invention relates to distance measuring apparatus and method and more particularly to apparatus and method for determining the distance between the cornea of the eye of a person and a fixed reference point.

Eye examinations to determine the so-called refractive error of a person's eyes are carried out by having the person view through various trial lenses on a screen. Different pairs of trial lenses are placed in front of the person and the person is asked to indicate his preference of lens for each pair, i.e., which lens of each pair provides the clearest view of the test symbol. In this manner, the refractive error of the person's eyes can be determined by determining what power of trial lens is required to correct the refractive error.

As is well known, the accuracy of determining the refractive error depends on maintaining a constant distance between the cornea of the subject's eye and the surface of the trial lens nearest the subject. If this distance, known as the vertex distance, is not maintained constant throughout the examination, spurious and inconsistent results may be obtained during the course of the examination. This is so because the vertex distance determines, in part, the effective power of lens needed to correct the refractive error of that distance.

To maintain a constant vertex distance during an eye examination, a chin rest and headrest may be provided so that the subject will remain in a fixed position relative to the trial lens. After fixing the vertex distance, it is still necessary to measure this distance so that eye glasses can be prepared which simulate the power of the refractive system (i.e., the trial lens and vertex distance) used to measure the subject's refractive error. That is, the refractive system which produced an indication of good vision during the examination procedure was based on a certain fixed vertex distance and if these results are to be reproduced in a pair of eye glasses for the subject, then that vertex distance must be taken into account. This does not mean the same vertex distance must be maintained in the eye glasses as was maintained during the examination, but the vertex distance maintained during the examination must be known so that the corrective power of the eye glasses compensates for any difference between the two vertex distances.

In prior art methods of measuring the vertex distance during eye examination, measuring apparatus is placed against either the eye ball itself or the eye lid of the subject to measure the distance between the eye surface or eye lid and the trial lens. If the apparatus is placed against the eye ball, an accurate measurement is obtained, but the subject generally exhibits discomfort with this type of measurement unless anasthetic drops are used. If the measuring apparatus is placed against the eye lid, then an error may be introduced in the measurement on account of the measurement being made from the eye lid rather than from the surface or cornea of the eye.

SUMMARY OF THE INVENTION

It is an object of the present invention, in view of the above mentioned prior art, to provide method and apparatus for measuring the vertex distance during eye examination without the need for touching the surface of the eye or the eye lid.

In accordance with one aspect of the invention, it is an object to provide a simple yet effective method and apparatus for fixing and maintaining the vertex distance during an eye examination.

In accordance with another aspect of the invention, it is an object to provide a method and apparatus for monitoring the vertex distance and for indicating the magnitude of any change therein during an eye examination.

In one specific illustrative embodiment of the invention, first and second light images are projected generally from first and second sources respectively, spaced on either side of a reference point on the refraction equipment, toward a subject whose eyes are being examined. The two souces are arranged so that the pathways traversed by the projected images intersect at some predetermined distance from the reference point, this distance corresponding to the desired vertex distance for the eye examined, the first and second images are superimposed on the cornea of the eye. When the subject is so positioned, the desired vertex distance is established.

BRIEF DESCRIPTION OF THE DRAWINGS

A complete understanding of the present invention and of the above and other objects and advantages thereof may be gained from a consideration of the following description presented in connection with the accompanying drawings in which.

DETAILED DESCRIPTION

Figure 1:
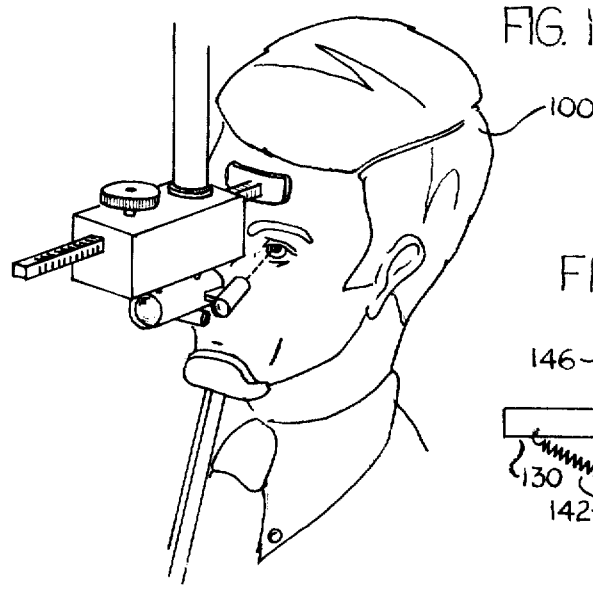
FIG. 1 is a perspective view of apparatus for determining the vertex distance made in accordance with the priciples of the present invention.
Figure 2:
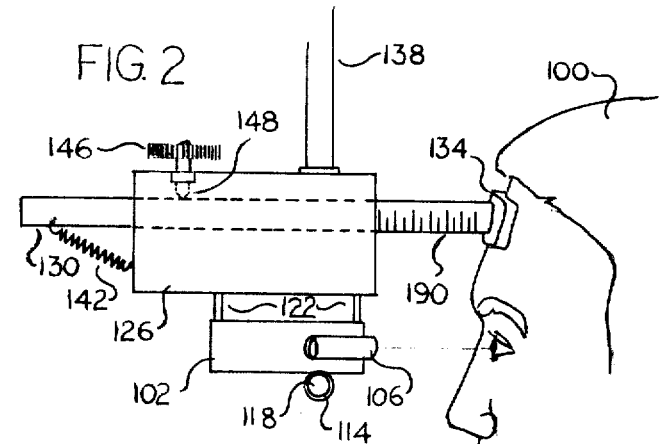
FIG. 2 is a side view of the apparatus of FIG. 1.
Figure 3:
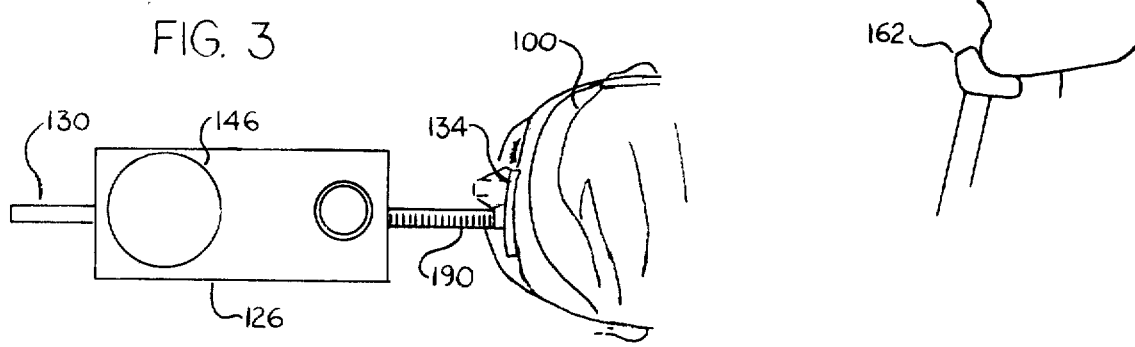
FIG. 3 is a top view of the headrest apparatus of FIG. 1.

FIGS. 1 through 4 show one illustrative embodiment of apparatus for determining and maintaining a fixed vertex distance for eye examinations. The apparatus is used in conjunction with and attached to a casing 102 for holding trial lens 104 (FIG. 4) for performing refractive error measurement. Typically, other trial lenses would be used in conjunction with the lens 104 to present before a subject lens combinations having different refractive powers. (The other lens which might be used in conjunction with the trail lens 104 are not shown in the drawings.)

Figure 4:
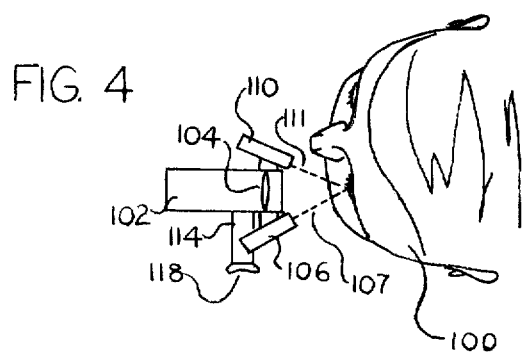
FIG. 4 is a top view of the image projecting apparatus and periscope structure of FIG. 1.

A pair of image projecting devices 106 and 110 are positioned on either side of the casing 102 as best seen in FIG. 4. Any suitable means for attaching the devices 106 and 110 to the casing 102 might be employed. The devices 106 and 110 are positioned to project light images to the right of the apparatus in the direction in which a subject 100 would be positioned. The devices 106 and 110 are oriented so that the pathways represented by dotted lines 107 and 111 traversed by the projected light images intersect at a predetermined distance from the trial lens 104. This distance is selected as the distance from the trial lens 104 at which a subject's eye is to be positioned for examination.

Figure 5A:
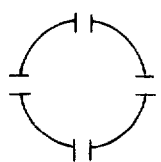
FIGS. 5A, 5B and 5C show exemplary images projected by the image projecting apparatus of FIG. 1.
Figure 5B:
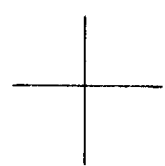
Figure 5C:
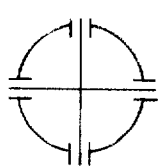
Figure 6:
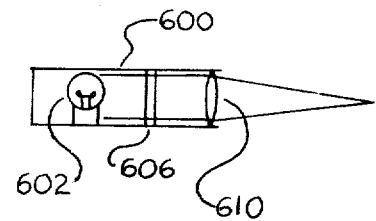
FIG. 6 shows a cross-sectional view of one of the image projecting devices of FIG. 1.

An exemplary image projecting device is shown in FIG. 6 and includes a cylindrical casing 600 (shown in cross-section), one end of which is enclosed and the other end of which is open. Positioned in the casing 600 at the closed end thereof is a light emitting source 602 which may simply be a common light bulb. A focusing lens 610 is positioned near the open end of the casing 600 for the purpose of causing the light passing therethrough from the light source 602 to converge as generally shown in FIG. 6. A transparent slide 606, such as glass or film, is positioned between the light source 602 and the lens 610. The image to be projected by the device of FIG. 5 would be included on the slide 606. (Types of images which could be utilized will be discussed later.) The focusing lens 610 is selected so that the image projected by the device will be in sharp focus at substantially the distance at which the light paths from the two image projecting devices intersect. The reason for this will become clear as the apparatus is further described. The described technique and apparatus for projecting the images are, of course, well known in the slide projector art, for example.

Also affixed to the casing 102 on the bottom surface thereof is a periscope 114 through which the person conducting the eye examination can view the cornea of the eye of the subject. The periscope 114 includes an eye piece 118 through which the examiner would look and an appropriate arrangement of mirrors internal to the periscope for directing light from the direction of the person's eye through the periscope 114 and eye piece 118. The periscope 114 is provided to allow the examiner a front view of the eye of the subject which, because of the placement of the apparatus in front of the eye of the subject, might not otherwise be possible or convenient. Of course, if a clear view of the cornea of the eye is presented, the periscope 114 may be omitted.

The trial lens casing 102 is attached by braces 122 to a headrest housing 126 which, in turn, is rotatably attached to a support boom or bar 138. The bar 138 forms part of an articulated arm having adjustable joints and swivels (not shown) to permit universal movement of the headrest housing 126. The articulated arm is carried by an appropriate floor or wall support.

The housing 126 is box-shaped and carries a slidable bar 130, with a scale 190 inscribed thereon, extending through an opening at either end of the housing (only one opening is shown in FIG. 1). A pad 134 covers one end of the bar 130 to allow the subject 100 to comfortably place his forehead against the end of the bar. One end of an extension spring 142 is attached to the outside of the housing 126 and the other end of the spring is attached near the non-padded end of the bar 130 to urge and maintain the bar against the head of the subject 100 when the subject is within a certain distance of the housing 126. Otherwise, the bar 130 is free to slide longitudinally in the housing 126.

A tightening screw 146 is located on top of the housing 126 and is adapted to be manually screwed into or out of the housing so as to cause the end 148 of the screw to be placed into or out of contact with the top surface of the bar 130. By screwing the screw 146 into the housing, the end 148 of the screw contacts the bar 130 and, by friction, prevents it from sliding in the housing 126. To free the bar so that it may slide, the screw 146 is simple screwed outwardly from the housing 126. The use of the vertex distance measuring apparatus will now be described.

A subject 100 whose eyes were to be examined would be initially positioned so that the subject's chin rested upon a chin rest 162. The vertex measuring apparatus would then be swung into position in front of the subject's face with the padded end of the bar 130 resting against the forehead of the subject and the image projection devices 106 and 110 positioned substantially at the subject's eye level. The image projecting devices 106 and 110 would then be activated to project images in the direction of the subject. Assuming that the subject were not yet properly positioned at the desired vertex distance, the projected images would probably fall on some part of the face of the subject, spaced horizontally from each other. The vertex measuring apparatus would then be moved either toward or away from the subject as was necessary to cause the images falling on the subject's face to move closer together toward the eye to be tested. When the apparatus was positioned so that the projected images were superimposed upon the cornea of the subject's eye, the desired vertex distance would be determined. Superimposition would occur, of course, when the cornea of the eye were located at the point of intersection of the image pathways. During the apparatus positioning procedure, as long as the subject was within a certain distance of the apparatus, the padded end of the bar 34 would be maintained in contact with the subjects's forehead by the spring 142. That is, the housing 126 would simply slide about the bar 130 as the housing was moved toward or away from the subject.

As indicated earlier, the examiner views the images projected on the cornea of the eye through the periscope 114 to determine when the images are properly superimposed. At this point, the cornea is at a known vertex distance from the trial lens 104. If the examiner desires to change this distance for some reason, he can simply note the position of the bar 130 with respect to the housing 126 by means of the scale 190 and instruct the subject to move forward or backward, as desired, a distance measured by the scale.

When the trail lens 104 and casing 102 are positioned at the desired vertex distance, the examiner tightens the screw 146 against the bar 130 to lock the bar in place relative to the housing 126. The bar is now positioned for the desired vertex distance, to provide a headrest for the subject. By instructing the subject to maintain his forehead against the bar 130, a constant known vertex distance can be maintained for the examination.

Figure 7:
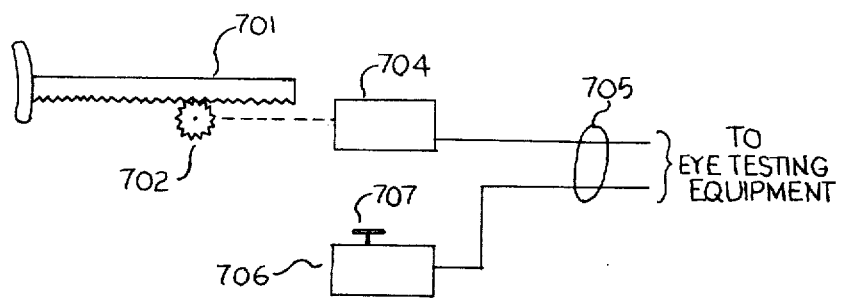
FIG. 7 schematically illustrates means for generating signals indicating vertex distance.

Rather than locking the bar 130 in place during the eye examination, it may be desirable to simply use the bar as a feeler gauge to disable automated eye testing equipment, whenever the subject moved from the desired vertex distance, or to provide for monitoring the vertex distance and to supply to the eye testing equipment a signal indicating the magnitude and direction of change of the distance. In such a case, movement detection apparatus could be included in the housing 126 to detect movement of the bar 130 and for signaling the automatic eye testing equipment accordingly. Exemplary movement detection apparatus is shown in FIG. 7. Such apparatus includes a rack and pinion gear combination 701 and 702, with the rack 701 corresponding to the bar 130 of FIGS. 1 through 3. As the rack 701 is moved forward or backward as result of movement by the subject, it causes the pinion 702 to rotate. The pinion 702 is mechanically coupled to a shaft angle encoder 704, which generates an output defining the horizontal position of the rack 701. This output would be utilized by the eye testing equipment, for example, to take into account any movement of the subject, i.e., any changes in the vertex distance.

Since the initial position of the rack 701 could be different for different subjects (e.g. because of different facial structure of the subjects) it is necessary to provide the eye testing equipment with an indication of the intial or starting position of the rack (at the beginning of the eye examination) any deviation from which the eye testing equipment will measure. A simple pushbutton signal generating device 706 is provided to enable the examiner to signal the eye testing equipment (by depressing a push button 707) when the subject is placed at the desired vertex distance. In response to this signal, the eye testing equipment records the initial position of the rack 701, and any changes from this position will be measured by the eye testing equipment. The outputs of the Encoder 704 and Signal Generator 707 can be connected to the eye testing equipment by cable 705.

Figure 8:
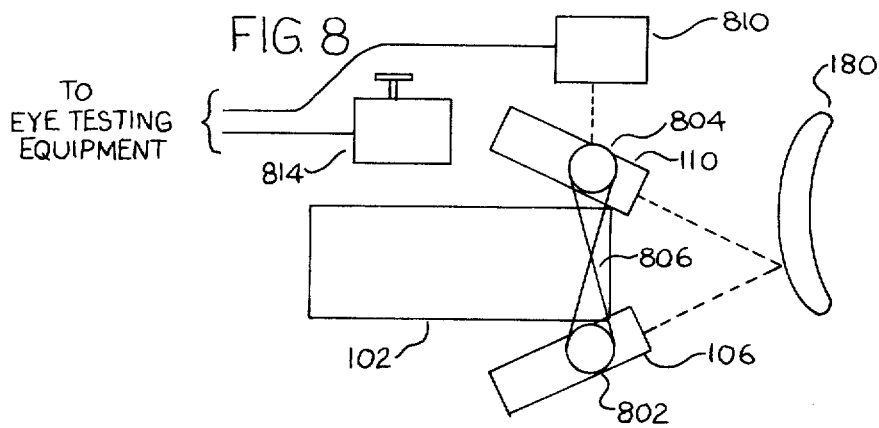
FIG. 8 schematically illustrates an alternative apparatus for determining or measuring the vertex distance.

Alternative apparatus for determining or monitoring the vertex distance is shown in FIG. 8. This apparatus includes light image projectors 106 and 110 each mounted on the housing 102 to rotate about a vertical axis. Discs 802 and 804 are mounted on the top of the light projectors 106 and 110 respectively, and disc 804 is mechanically coupled to a shaft angle encoder 810. The discs 802 and 804 are mechanically coupled together by a linkage 806 so that rotation of one of the light projectors will cause rotation of the other projector by an equal amount but in an opposite direction. The shaft angle and encoder 810 is electrically coupled to the aforementioned automated eye testing equipment to provide a signal of the angular position of the disc 804 and thus of the light image projector 110. A push-button signaling device 814, similar to that discussed in connection with FIG. 7, is also provided. Also included is a fixed headrest 180.

In operation, after the subject is positioned against the headrest 180, the light image projectors 106 and 110 are rotated until the projected images are superimposed on the cornea of the subject's eye. The push button on the push-button device 814 is then depressed causing a signal to be applied to the eye testing equipment. The eye testing equipment then records the signal generated by the shaft angle encoder 810 representing the angular position of the light projectors 106 and 110. The vertex distance V is given by the formula $V = D/2 \, \text{Cotan} \, \Theta$ where $D$ represents the distance between the projectors and $\Theta$ represents the angle between the long axis of the projectors and a line extending midway between the projectors from a point at which the projected light images intersect. Of course, from this formula, the automated eye testing equipment can determine the vertex distance.

FIG. 5 graphically shown exemplary images which might be used in connection with the image projecting devices 106 and 110. For example, the image shown in FIG. 5A might be projected by the image projecting device 110 and the image shown in FIG. 5B projected by the device 106. The proper vertex distance would be indicated when the two images were superimposed as shown in FIG. 5C on the cornea of the subject's eye. Numerous image shapes or configurations could be employed facilitating ease of determining proper superimposition of the images.

Although the invention has been described with respect to a particular preferred embodiment thereof, many changes and modifications will become apparent to those skilled in the art in view of the foregoing description which is intended to be illustrative and not limiting of the invention. The appended claims are intended to cover such changes and modifications.

What is claimed is:

1. Apparatus for defining a distance between the surface of the eye of a person and a reference point comprising a frame on which said reference point is defined, first projecting means carried by said frame and positioned on one side of the reference point for projecting an image in a first direction generally toward the person's eye, second projecting means carried by said frame and positioned on the other side of the reference point for projecting an image in a second direction generally toward the eye, said projecting means being positioned so that the projected images will be superimposed on each other on the surface of the eye when the eye is located at a predetermined distance from the reference point, a housing secured to said frame, movable headrest means extending from said housing for contacting the head of the person and movable with respect to the reference point, biasing means for urging the headrest towards the person and maintaining contact between headrest and the head of the person when the head is within a certain distance of the reference point and an indicating means for providing an indication of the position of said moveable headrest means relative to the reference point.

2. Apparatus as in claim 1 further comprising manual means for locking said movable means in a position fixed relative to the reference point.

3. Apparatus as in claim 1 wherein said indicating means comprises means for generating and electrical signal indication of the position of said movable headrest means relative to the reference point.

4. Apparatus as in claim 1 further comprising periscope means secured to said frame and positioned to enable a person to view therethrough the surface of said eye when the eye is located substantially at said predetermined distance from the reference point.

5. Apparatus as in claim 1 wherein said indicating means comprises indicia on said movable means for indicating the position of said headrest relative to said reference point.

6. Apparatus as in claim 1 including mounting means for rotatably mounting said first projection means and said second projection means on said frame for rotation about generally vertically disposed, parallel axis, means responsive to rotation of one of said projecting means for causing the other projecting means to rotate by a mount equal to but opposite in direction of the rotation of said one projecting means to cause the first and second light images to be superimposed on the cornea of the person's eye at different pre-determined distances, means for indicating the rotational position of the first projecting means.

7. Apparatus as in claim 6 wherein said indicating means comprises a shaft angle Encoder for generating a signal indicating the rotation of said first projecting means.

8. Apparatus as in claim 1 wherein each of said projecting means comprises a light emitting means, a focusing lens for focusing the projected image at substantially said desired distance, and a transparent slide positioned between said light emitting means and said focusing means for carrying the image light from said light emitting means through said slide and said focusing means to project the light image.

9. Apparatus as in claim 8 wherein the image of the transparent slide associated with the first projecting means is different from but complimentary to the image of the transparent slide of the second projecting means.

10. Apparatus for fixing the distance between the cornea of the eye of a person and a reference point on refraction equipment comprising means secured to said refraction equipment on one side of the reference point for projecting a first light image along a first pathway generally toward the person, means secured to said equipment on the other side of said reference point for projecting a second light image along a second pathway generally toward the person, said first and second pathways intersecting a predetermined distance from the reference point, the desired distance between the cornea of the eye and the reference point being established when the first light image is superimposed over the second light image on the cornea of the eye, a headrest feeler means for contacting the persons forehead when the eye of the person is positioned at said desired distance from said reference point, and means responsive to movement of said feeler means for generating an electrical signal to thereby indicate that the persons forehead has moved.

11. Apparatus as in claim 10 wherein said projecting means each comprise a light emitting means, a focusing lens for focusing the projected image at substantially said desired distance, and a transparent slide positioned between said light emitting means and said focusing lens for carrying the image light from said light emitting means passing through said slide and said focusing lens to project the light image.

12. Apparatus as in claim 10 wherein said signal generating means includes means for generating a signal indicating the magnitude of the movement of said feeler means.

* * * * *